US005408268A

United States Patent [19]
Shipp

[11] Patent Number: 5,408,268
[45] Date of Patent: * Apr. 18, 1995

[54] VIDEO IMAGING SYSTEM AND METHOD USING A SINGLE FULL FRAME SENSOR AND SEQUENTIAL COLOR OBJECT ILLUMINATION

[75] Inventor: John I. Shipp, Tullahoma, Tenn.

[73] Assignee: Apollo Camera, L.L.C., Tullahoma, Tenn.

[ * ] Notice: The portion of the term of this patent subsequent to Feb. 28, 2012 has been disclaimed.

[21] Appl. No.: 156,064

[22] Filed: Nov. 22, 1993

Related U.S. Application Data

[63] Continuation-in-part of Ser. No. 905,278, Jun. 26, 1992, Pat. No. 5,264,925.

[51] Int. Cl.⁶ .............................................. H04N 9/04
[52] U.S. Cl. ..................................... 348/269; 348/303
[58] Field of Search ............... 348/222, 234, 266, 268, 348/269, 317, 303, 320, 322; H04N 9/04; 358/44

[56] References Cited

U.S. PATENT DOCUMENTS

| | | | |
|---|---|---|---|
| 4,074,306 | 2/1978 | Kakinuma et al. | 358/1 |
| 4,253,447 | 3/1981 | Moore et al. | 128/6 |
| 4,862,275 | 8/1989 | Meisenzahl | 358/213.29 |
| 4,967,264 | 10/1990 | Parulski | 358/44 |
| 5,264,925 | 11/1993 | Shipp et al. | 358/44 |

FOREIGN PATENT DOCUMENTS 63-227293  9/1988  Japan .

*Primary Examiner*—Victor R. Kostak
*Assistant Examiner*—Sherrie Hsia
*Attorney, Agent, or Firm*—Waddey & Patterson; Mark J. Patterson

[57] ABSTRACT

A sequential video imaging system uses a video sensor having full frame whereby image data is moved from sensor image elements to a video amplifier. The object being viewed is sequentially illuminated with colored light sources to produce RGB or luminance and chrominance video signals. A digital signal processor includes data buffering and summing circuits.

5 Claims, 8 Drawing Sheets

TABLE 1   RGB ARCHITECTURE

| CCD | F0 | D0 | D2 | D4 |
|---|---|---|---|---|
|  | F1 | D1 | D3 |  |

| | D0 | D1 | D2 | D3 | D4 |
|---|---|---|---|---|---|
| T0 | R1E | R1O | - | - | - |
| T1 | G1E | G1O | G1E | R1O | - |
| T2 | B1E | B1O | B1E | G1O | R1E |
| T3 | R2E | R2O | R2E | B1O | G1E |
| T4 | G2E | G2O | G2E | R2O | B1E |
| T5 | B2E | B2O | B2E | G2O | R2E |

| | R | G | B |
|---|---|---|---|
| T0 | D0 | - | - |
| T1 | D3 | D0 | - |
| T2 | D4 | D3 | D0 |
| T3 | D1 | D4 | D3 |
| T4 | D2 | D1 | D4 |
| T5 | D3 | D2 | D1 |

FIG. 6

YC ARCHITECTURE    (C=RED OR BLUE)

|    | D0  | D1  | D2  | D3  | D4  | D5  | D6  |
|----|-----|-----|-----|-----|-----|-----|-----|
| T0 | Y1E | Y1O | -   | -   | -   | -   | -   |
| T1 | Y1E | Y1O | -   | -   | -   | -   | -   |
| T2 | R1E | R1O | Y1E | Y1O | -   | -   | -   |
| T3 | R1E | R1O | Y1E | Y1O | -   | -   | -   |
| T4 | Y2E | Y2O | R1E | R1O | Y1E | Y1O | -   |
| T5 | Y2E | Y2O | R1E | R1O | Y1E | Y1O | -   |
| T6 | B1E | B1O | Y2E | Y2O | R1E | R1O | Y1E |
| T7 | B1E | B1O | Y2E | Y2O | R1E | R1O | Y1E |
| T8 | Y3E | Y3O | B1E | B1O | Y2E | Y2O | R1E |
| T9 | Y3E | Y3O | B1E | B1O | Y2E | Y2O | R1E |

|    | Y   | R   | B   |
|----|-----|-----|-----|
| T0 | -   | -   | -   |
| T1 | -   | -   | -   |
| T2 | Y1O | -   | -   |
| T3 | Y1O | -   | -   |
| T4 | Y1E | R1E | -   |
| T5 | Y1E | R1E | -   |
| T6 | Y2O | R1O | R1O |
| T7 | Y2O | R1O | R1O |
| T8 | Y2E | R1E | B1E |
| T9 | Y2E | R1E | B1E |

*FIG. 9*

VIDEO IMAGING SYSTEM AND METHOD USING A SINGLE FULL FRAME SENSOR AND SEQUENTIAL COLOR OBJECT ILLUMINATION

This is a continuation-in-part of U.S. patent application Ser. No. 07/905,278 filed Jun. 26, 1992, U.S. Pat. No. 5,264,925, for "Single Sensor Video Imaging System and Method Using Sequential Color Object Illumination."

BACKGROUND OF THE INVENTION

The present invention relates to an improved system and method used for processing color images from a sequentially illuminated object to form high resolution color video signals suitable for use in viewing the object on a video monitor.

It will be appreciated by those skilled in the art that the use of charge coupled devices (CCD) as sensors in video imaging systems has become quite popular, as, for example, where small size and low power consumption is desired. In the processing of color video images, it is preferred for a number of reasons that a single CCD sensor be used.

There are three basic types of solid state devices that are usable as sequential video sensors. Full frame CCD sensors employ an array of integrating CCD devices which act as photosensitive capacitors. The images are projected onto the parallel array which acts as the image plane. The device partitions the scene information into discrete sensor elements defined by the number of pixels. The charge that accumulates in each pixel during the integration period, representing rows of scene information, is shifted in parallel fashion along rows and columns (parallel register) of the photo sensitive CCD's to an output serial register. The image data is then shifted in serial fashion to a signal sensing output amplifier during the data readout cycle. This process repeats until all rows are transferred off of the device. The output from the amplifier can then be used to reconstruct the image. Because the parallel register of full frame CCD sensor is used both for scene detection and data readout, either a shutter or synchronized strobe illumination must be used to preserve integrity of the image.

The advantage of a full frame CCD sensor is that it contains the complete complement of vertical lines. Therefore, higher resolution images with less "smear" can be obtained. Full frame devices give 480 total lines of true resolution but they must be shuttered or the light source strobed off during data readout.

Prior art color sequential illumination and processing methods are deficient in either the level of resolution obtainable, in their need for a higher rate of sampling of data from the sensor, or in their relative sensitivity. For example, in U.S Pat. No. 4,253,447 is disclosed a sequential illumination process which requires reading out of only half the field lines (corresponding to either the even or the odd fields), resulting in a 50% reduction in vertical resolution. The '447 patent also discloses a second method whereby the object is sequentially illuminated by all three primary colors during each of the odd and even field periods. Unfortunately, this method requires that the CCD data be read at three times the standard speed which is not always possible. In addition, this technique requires six field memories and for a given signal-to-noise ratio, it is less sensitive than the current invention by a factor of three.

Prior art light sources used in conjunction with a sequential color video camera include: sequentially lighting the object field with each primary color by rotating a three-color segmented filter in the path of a white light source; sequentially illuminating the object with a plurality of solid state light emitting chips mounted in a single transparent package, as disclosed in U.S. Pat. No. 4,074,306; or sequentially illuminating the object with three white strobe lights with a different primary color filter in each of the strobe light paths, as shown in U.S. Pat. No. 4,253,447. All of these methods are troublesome.

Applicant's co-pending U.S. Pat. application Ser. No. 07/905,278, filed Jun. 26, 1992, the drawings and specification of which, as amended, are incorporated by this reference, describes a novel method of producing video images using a single sensor, sequential primary color illumination, and non-color specific RGB video data memories.

Two major problems are manifested in this prior art. The efficiencies of green and blue LED's are lower than the red LED's. The efficiency of red LED's are typically 4%, greens 0.4%, and blues 0.04%. The efficiency differences, green to red, can be solved by using multiple green LED's. However, the very low efficiency of the blue LED's make the use of an adequate number of blue LED's impractical. The prior art required that a high gain video amplifier be switched into the video signal during the blue portion of the illumination sequence to insure proper white balance. The high blue signal gain requirement causes circuit instability and limits the dynamic range of the camera.

Traditional methods of compensating for the low signal strengths have resulted in a reduced temporal or spatial resolution to the point where image quality is unsatisfactory. In addition, still images obtained from prior art video imaging systems are blurred, owing to temporal differences between the two field images and to color edge effects on moving objects.

What is needed is a video imaging system which uses sequential color illumination of an object with reflected light image data sensed by a CCD sensor having full frame architecture. This system should use a single sensor and a minimum of memory devices, and a flicker-free method of processing video signals from the sensor without degradation of spatial resolution or sensitivity, and without the need for accelerated sampling rates. Preferably, this apparatus should also be adaptable to applications which would benefit from remote transmission of video data.

SUMMARY OF THE INVENTION

The video imaging system of the present invention uses a single CCD video sensor having a full frame architecture. The object to be viewed by the imaging system is illuminated by sequential activation of red, green, and blue LED's in accordance with timing signals generated by a master timer. The sensor has an array of individual integrating sensor elements arranged into parallel rows. The resulting rows of image information are then shifted in a parallel fashion to a serial register which subsequently shifts the row of information to the output as a serial stream of data. The process repeats until all rows of image information are transferred off the sensor.

The resulting frames of image data are then amplified and digitized before being moved to a digital signal processor.

The processor includes non-color specific memory devices which, in accordance with the timing method and matrix switch of the system, generate digitized RGB video signals which are then sent to digital to analog converters.

The human eye perceives spatial and temporal resolution, primarily through luminance rather than chrominance. The system of the present invention teaches a method of increasing the signal level and signal-to-noise ratio of, for example, the blue signal in a color sequential camera, by creating luminance and chrominance signals from image data accumulated in a CCD sensor. The chrominance signals are spatially and temporally compressed to yield higher signal and signal-to-noise ratios with very little resulting loss in perceived resolution, either spatial or temporal. This is accomplished by using a full frame video sensor device. A luminance signal is created by simultaneously illuminating the object with red and green LED's for a field period which is alternated between video data readout periods and illumination periods of red and blue LED's alone. The red and blue signals strengths are increased by "binning" charge from adjacent pixels together within the sensor. This method results in lowering the gain requirement for the blue signal with little loss in perceived temporal or spatial resolution since the luminance signal contains full temporal and spatial resolution. The number of pixels added together can be varied, according to one embodiment of the present invention, depending on the blue signal strength. Still images extracted from the improved camera are also sharper. Additionally, the resulting output signal can be converted to either NTSC or PAL formats without the need for changing sensors.

An object of the present invention, then, is to eliminate flicker in a simplified sequential color video system while maintaining good spatial and temporal resolution.

A further object of the present invention is to provide a simplified sequential color video imaging system having improved signal strengths and signal-to-noise ratios while compensating for the lower efficiency of green and blue LED illumination sources.

BRIEF DESCRIPTION OF THE DRAWINGS

FIG. 6 contains a table showing data present at each data node D of FIG. 3 at the end of each illumination period T, where E represents the even field and O represents the odd field. The table of FIG. 6 further shows the video data switched to the red, green, and blue signal output ports of FIG. 3 at each illumination period T.

FIG. 9 contains a table showing data present at each data node D of FIG. 8 at the end of each illumination period T, where E represents the even field and O represents the odd field. The table of FIG. 9 further shows the video data switched to the Y, C1 and C2 signal output ports of FIG. 8 at each illumination period T, where C(n) can be either red or blue.

DESCRIPTION OF THE PREFERRED EMBODIMENT

Figure 1:
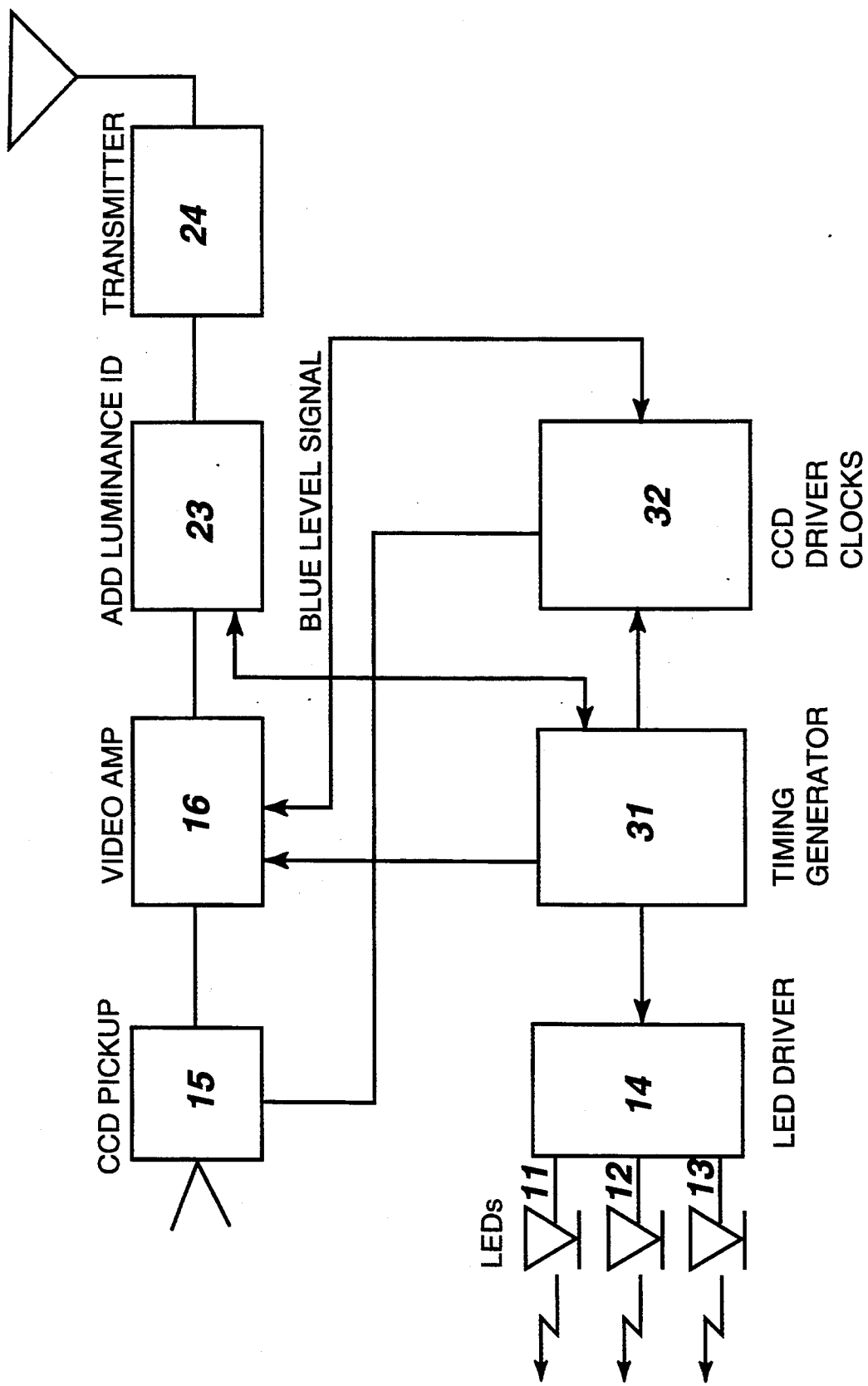
FIG. 1 is a block diagram of the camera head portion of a first embodiment the full frame sensor video imaging system which generates and processes luminance and chrominance video signals.
Figure 2:
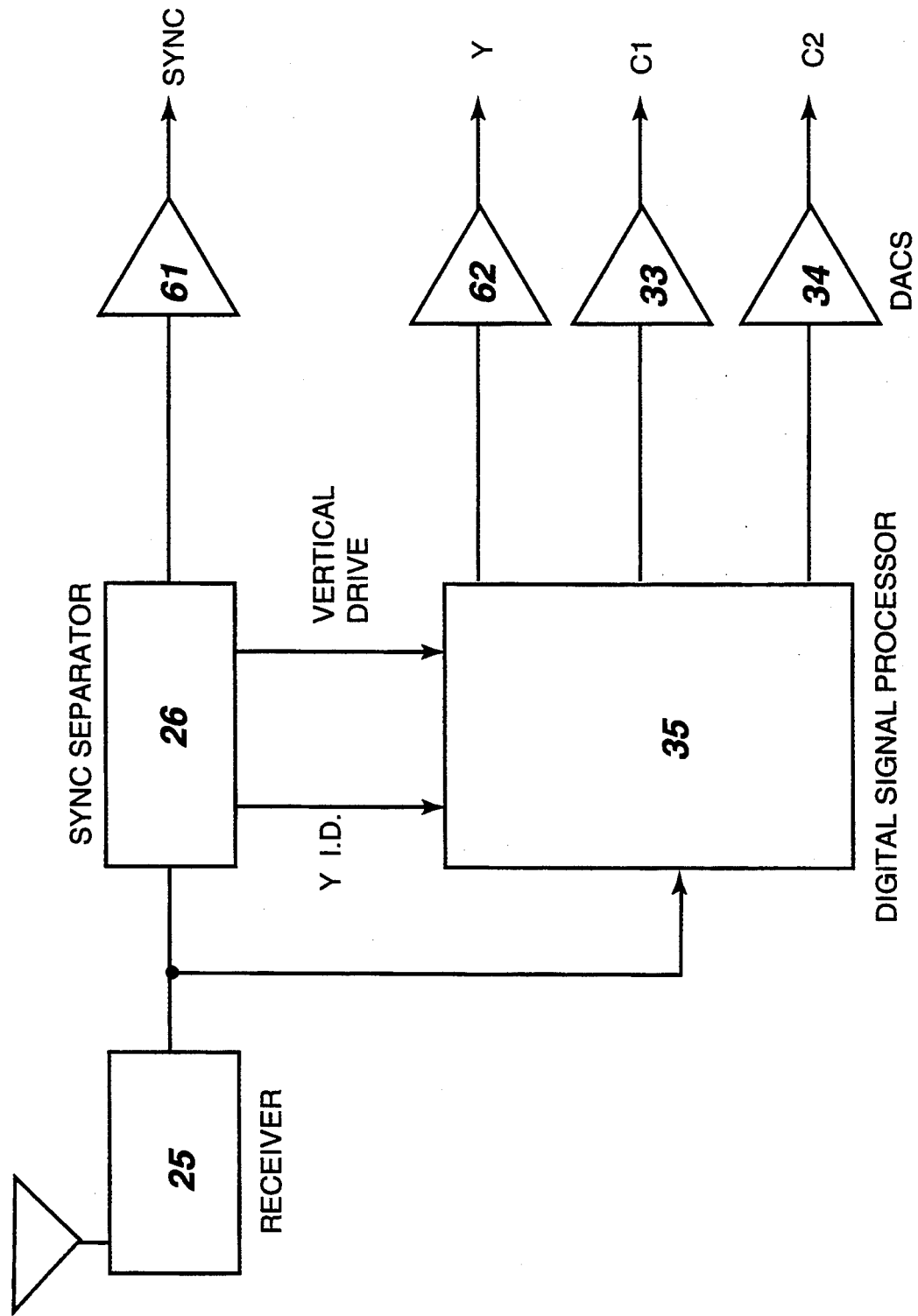
FIG. 2 is a block diagram of the base unit portion of the imaging system of FIG. 1.

Referring now to FIGS. 1 and 2, the general arrangement of the functional blocks of the video imaging system is shown. The camera head portion of FIG. 1 would, in the preferred embodiment, be part of an endoscopic camera used for viewing objects located within a body cavity. Accordingly, the illumination source of the system, including red, green, and blue LED's 11, 12, and 13, would preferably be located at or near the distal end of the endoscope, for purposes of directing colored light at the object to be viewed, in a sequential manner described below. LED driver 14 is operably connected to each red, green, and blue LED 11, 12, 13, providing a controllable activation voltage and current in response to master timing signals generated by master timer 31.

Figure 7:
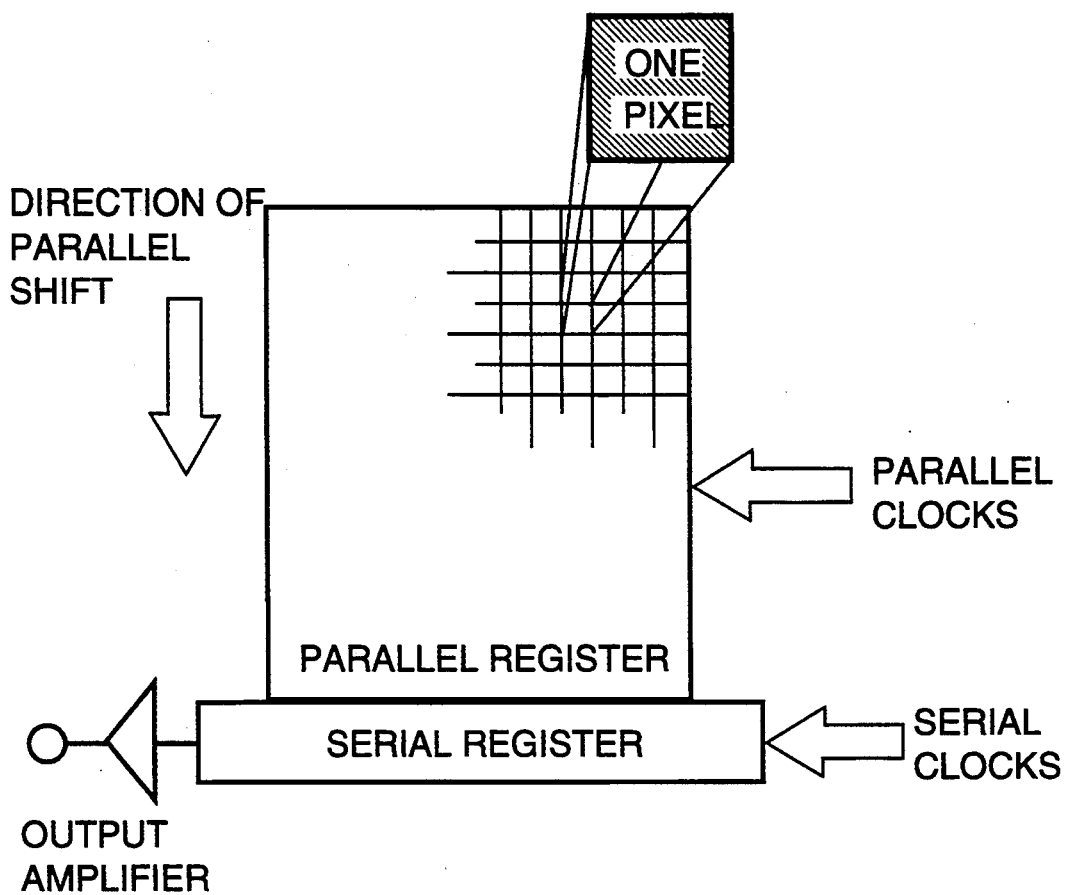
FIG. 7 is an block diagram illustration of a typical CCD sensor with full frame architecture.

Light reflected from the object is focused on CCD sensor 15 having a full frame architecture as in FIG. 7. Sensor driver/timer 32 provides horizontal and vertical timing signals to sensor 15, also in response to timing signals from master timer 31, to cause parallel shifting of rows of image data to the serial shift register of the sensor and shifting of data out of sensor 15. Serial video image data from sensor 15 is transferred to video amplifier 16 which can have a switchable gain feature, coupled with automatic gain control, to allow amplifier 16 to apply a different level of gain to each different color. Amplifier 16 also has a dark clamping feature and can also be provided with an analog-to-digital convertor when transmission of digitized rather than analog video data from the camera head is desired.

Because the embodiment of the system and method of the present invention shown in FIGS. 1 and 2 relies on the generation and use of chrominance ("C") and luminance ("Y") video signals, a luminance ID circuit 23, also synchronized with master timer 31, is used to add an identifier signal to communicate to the camera base unit (FIG. 2) which of the signals in the sequence of digitized data received by the base unit is a Y signal. The video data, with luminance identifier added, and further including synchronization and vertical drive timing signals, is then transmitted from the camera head of FIG. 1 to the base unit of FIG. 2 by transmitter 24. Preferably, wireless radio communications are used as the link between the camera head and base unit but any conventional hardwired or wireless remote link can be employed.

Looking at FIG. 2, the transmitted analog (or digital) video data is accepted at receiver 25 where it is then sent concurrently to sync separator 26 and digital signal processor (DSP) 35. Sync separator 26 strips the sync, vertical drive, and luminance ID signals from the video signal in a conventional manner well known to those skilled in the art. DSP 35 is a microprocessor having the further capability of performing analog to digital conversion, as well as buffering (storing), averaging, and filtering of digital data in real time, at video rates.

After and during processing of the video image data, luminance ID signals, and vertical drive signals by DSP 35 as described below, a digitized luminance (Y) signal is generated and provided to digital to analog convertor (DAC) 62. First and second chrominance (C1 and C2) signals are also generated and directed to DAC's 33 and 34. The resulting analog outputs of DAC's 62, 33, and 34 are then usable in a conventional manner by a YC video monitor which, in conjunction with a sync signal from DAC 61, reconstructs and displays the image of the object being viewed.

Conventionally, luminance is defined as:

$$Y = 0.3R + 0.6G + 0.1B \qquad (1)$$

where R, G, and B are the red, green, and blue light (RGB) video signal levels. For purposes of maximizing the blue signal strength in accordance with one objective of the system, Y herein is defined as:

$$Y = aR + bG \qquad (2)$$

where a and b are somewhat arbitrary constants such that $a + b = 1$. Because of spatial resolution considerations, the value of b should preferably be between 0.3 and 0.7. The choice of values within this range is based somewhat on subjective perceptions of the corresponding image quality. Otherwise the values of b (and hence a) are selected based on thermal considerations. The lack of efficiency of green LED's would suggest lower values for b provided the resulting image quality is adequate. With $a = b = 0.5$ a high quality image is readily obtainable, for example.

The first and second chrominance signals are defined by:

$$C1 = Y - R \qquad (3)$$

$$C2 = Y - B \qquad (4)$$

Figure 5:
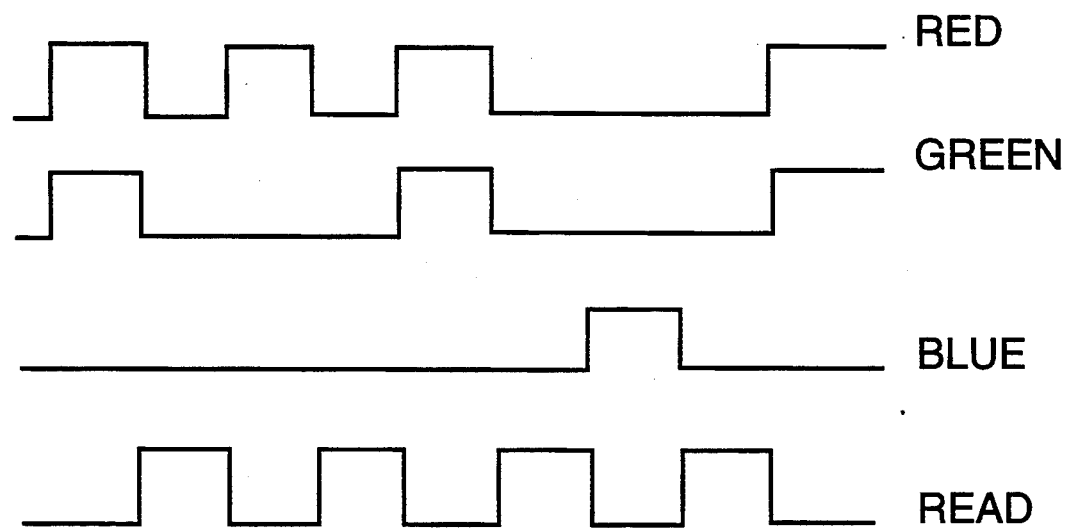
FIG. 5 is a timing diagram showing the timing relationship between and among the activation of the red, green, and blue light sources and corresponding readout of the video data in YC format.

Referring to the timing diagram in FIG. 5, the sequence of illumination and readout events in the first embodiment of the system are illustrated. The sequence begins when LED driver 14, responding to signals from master timer 31, activates red and green LED's 11 and 12 together, in accordance with equation (2), for one Y illumination period (first and second lines of FIG. 5), preferably equal to a standard television field period for synchronous operation. Thus, in accordance with equation (2), red LED's 11 and green LED's 12 will be activated for equal periods, with the drive signals applied by driver 14 controlled such that the total light output from red LED's 11 and green LED's 12 will be equal during the illumination period. Of course, if constants a and b of equation (2) are chosen to have different values, the drive signals from driver 14 applied to red and green LED's 11 and 12 will have to be adjusted so that the respective light outputs during the illumination period reflect the ratio of the a and b constants.

During the first illumination period, the combined red and green light reflected from the object being viewed is focused on CCD sensor 15 where it is integrated by the photosensitive CCD image array. Then red LED's 11 and green LED's 12 are turned off in response to master timer 31 and CCD driver 32 so that the luminance Y data integrated during the first Y illumination period can be shifted and read during a readout period (line 4 of FIG. 5), also equal to a standard television field period for synchronous operation. During the next or third field period, red LED 11 is activated alone. The resulting integrated video data is read off sensor 15 during the fourth field period.

A second Y (red plus green) illumination period follows, then a readout period where the second Y video data is shifted and read. Next, blue LED's 13 are activated alone by master timer 31 and driver 14 for a field period, followed by a blue video data readout period. The sequence of illumination and readout periods then repeats.

During the blue video data readout, a timing signal from master timer 31 and CCD driver 32 causes video amplifier 16 to increase its gain by a pre-programmed amount to compensate for the lower blue signal level.

The ratio of the duration of the Y luminance signal illumination periods to the duration of the red and blue (chrominance) signal illumination periods can be varied, depending on the readout time required or preferred for the red and blue signals.

During the periods of red and blue signal readout, modified timing signals are sent by master timer 31 to CCD driver 32 so that at least two rows of data from the image array of sensor 15 are summed into the sensor's parallel (horizontal) register while at least two horizontal sensor elements (pixels) are summed onto the output. This "binning" technique has the effect of summing at least a $2 \times 2$ matrix of pixels (image sensor elements), resulting in an average signal strength increase of a factor of four for both the red and blue signals. The red and blue signal levels can, if needed, be increased by a factor of nine by binning $3 \times 3$ pixel matrices, or by a factor of $n^2$, for a matrix of $n \times n$. The signal-to-noise ratio will increase by a factor of two for $2 \times 2$ binning and by a factor of three for $3 \times 3$ binning.

As shown on FIG. 1, blue signal strength data can be fed to CCD driver 32 to select a $2 \times 2$, $3 \times 3$ (or higher) binning matrix to increase the blue signal level.

The sequential Y, red, and blue signals are transmitted to the base unit as shown in FIG. 2, either by wire or wireless means, in either digital or analog format. The sync, vertical drive, and Y ID signals are stripped and the signals are supplied to DSP 35. DSP 35 includes conventional processing means for averaging the Y signal over the chosen $n \times n$ pixel matrix so that the Y signal temporally matches the binned red and blue signals. DSP 35 further produces the first and second chrominance signals as per equations (3) and (4) above and outputs these digitized signals to DAC's 62, 33, and 34, to form analog YC signals which can be displayed on a YC monitor. DSP 35 can also produce RGB, NTSC, or PAL format outputs.

It should be noted that it is not necessary for the frame rate of the camera head to match the timing of NTSC or PAL formats, i.e., the camera head and base units can be operated asynchronously. DSP 35 contains sufficient data buffers and timing circuits, well known to those skilled in the art, such that slower frame rates can be used in the camera head to further increase the signal strengths by using longer integration times. For example, if the camera head frame rate needed to be lowered by ten percent to synchronize it to either NTSC or PAL timing, DSP 35 would be programmed to insert a repeat frame in the video data stream every tenth frame.

Figure 3:
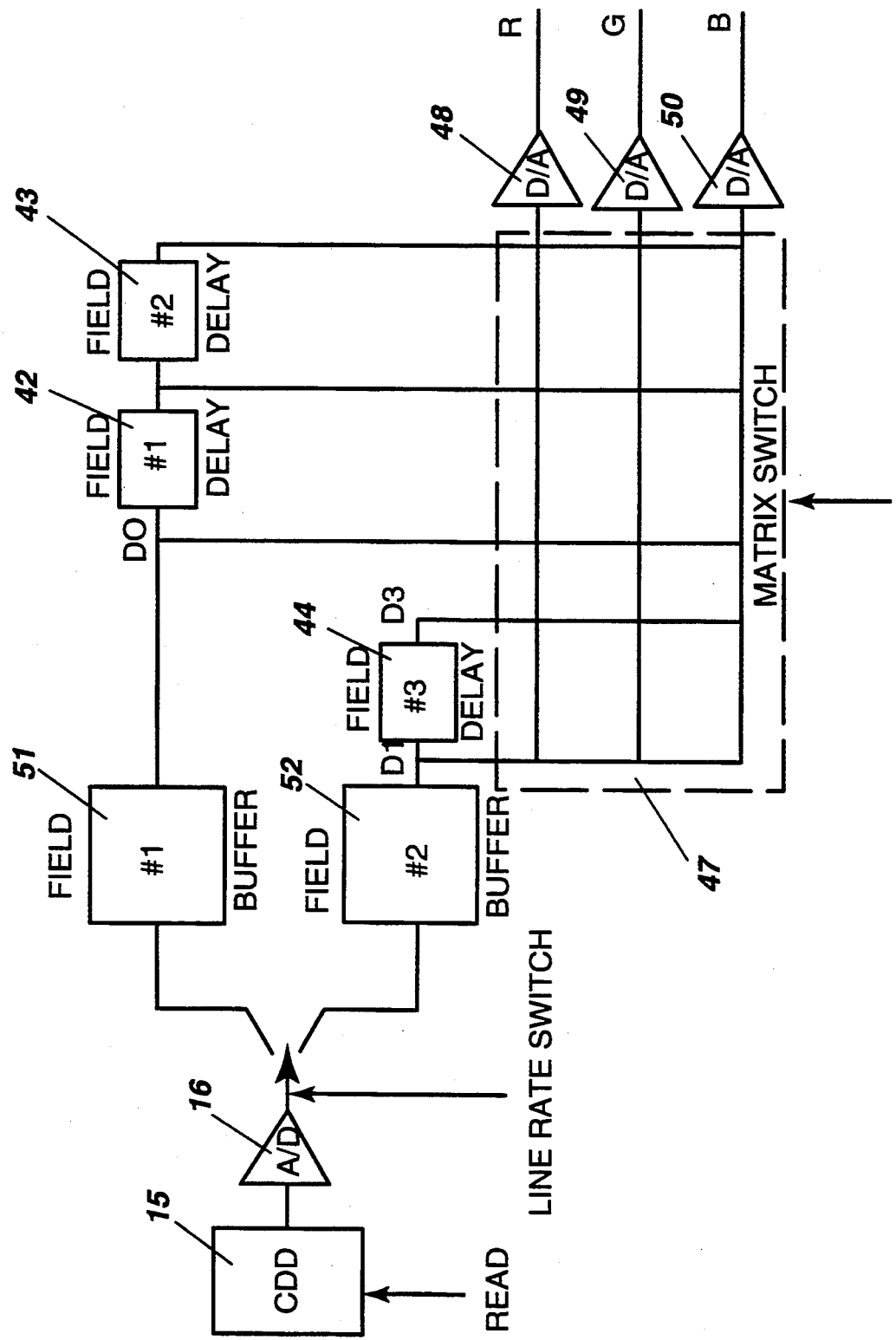
FIG. 3 is a block diagram representation of a second embodiment of the video imaging system, showing the non-color specific video data memory units and corresponding matrix switch, with output in RGB format.
Figure 4:
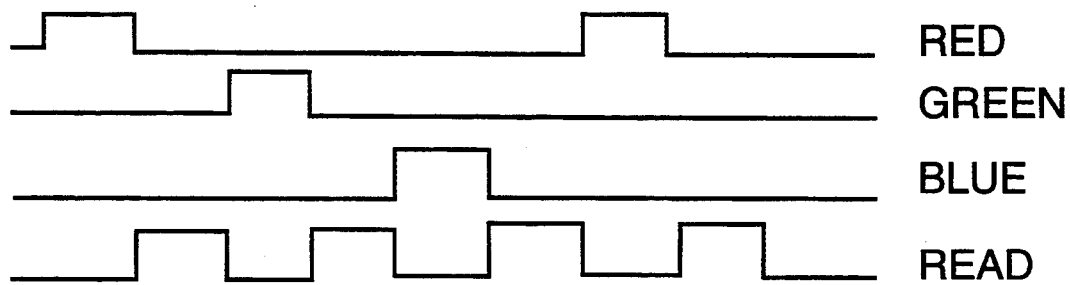
FIG. 4 is a timing diagram showing the timing relationship between and among the activation of the red, green, and blue light sources and corresponding readout of the video data in RGB format.

Looking now at FIG. 3, further detail of a second embodiment specifically adapted for generating RGB format video signals is shown, including signal nodes D0, D1, D2, D3, and D4 corresponding to FIG. 6. The embodiment of FIG. 3, while implementing the basic method of the improved camera system, also uses features of the novel method of applicant's co-pending U.S. patent application Ser. No. 905,278. The timing of the events implemented in the embodiment of FIGS. 3 and 6 is shown on FIG. 4. Primary color illumination sources, preferably red, green, and blue LED's (not shown) are sequentially activated as shown on lines 1–3 of FIG. 4. The primary color illumination periods come between readout periods during which video data corresponding to the charge integration in sensor 15 during the previous primary color illumination period is read out. The video data is digitized in A/D 16 and then alternatively switched between first and second data buffers 51 and 52 by line rate switch 45. The video data from buffers 51 and 52 is then presented to RGB output DAC's 48, 49 and 50, either directly or following one or more delay periods in field delay/memory units 42, 43, and 44.

Matrix switch 47 controls the switching of the RGB video data between the buffers, memory units, and output DAC's in accordance with the basic method set forth in applicant's U.S. Application Ser No. 07/905,278, and as further illustrated in the table of FIG. 6.

The table of FIG. 6 illustrates the sequence of illumination periods, readout periods, and delays of the RGB data and video signal outputs at each of a sequence of field or illumination periods, T. In FIG. 6, "E" represents the even field and "O" the odd video field.

Figure 8:
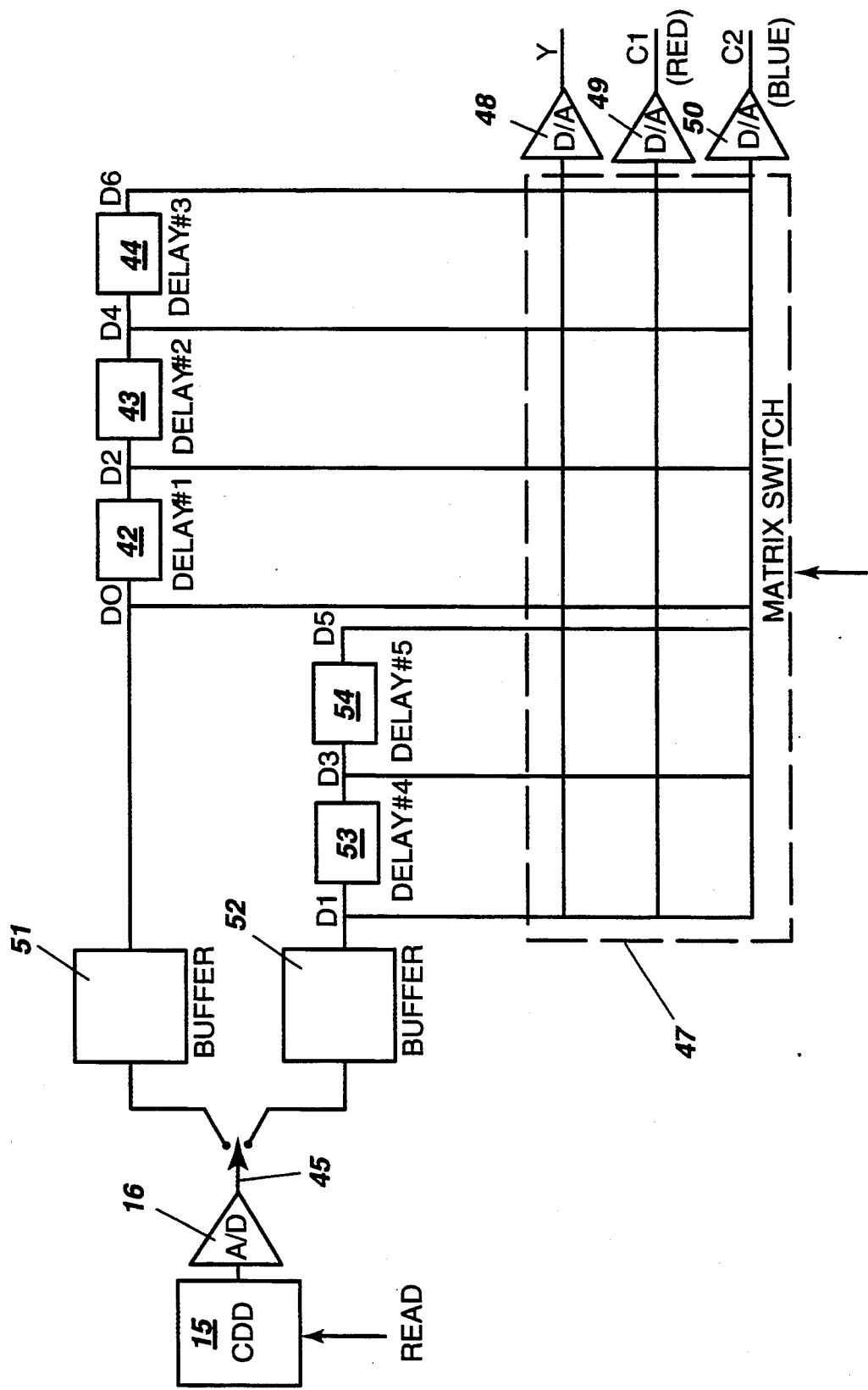
FIG. 8 is a block diagram representation of an embodiment of the video imaging system having YC architecture and non-color specific luminance and first and second chrominance memory units and a corresponding matrix switch, with output in YC format.

Similar delay and memory unit processing can be implemented for YC format video signals as well, using luminance and first and second chrominance memory units. Accordingly, FIG. 8 illustrates a preferred arrangement of components which implement the YC architecture using non-color specific field delay/memory units. The embodiment of FIG. 8, while implementing the basic method of the improved camera system, also uses features of the novel method of applicant's U.S. Pat. No. 5,264,924. The timing of the events implemented in the embodiment of FIGS. 2 and 8 is shown on FIG. 5. Primary color illumination sources, preferably red, green, and blue LED's (not shown) are activated as shown on lines 1–3 of FIG. 5. The primary color illumination periods come between readout periods during which video data corresponding to the charge integration in sensor 15 during the previous primary color illumination period is read out. The video data is digitized in A/D 16 and then alternatively switched between first and second data buffers 51 and 52 by line rate switch 45. The video data from buffers 51 and 52 is then presented to Y, C1, and C2 output DAC's 48, 49 and 50, either directly or following one or more delay periods in field delay/memory units 42, 43, 44, 53, or 54. It will be apparent to those skilled in the art that in this embodiment, the delays 42, 43, 44, 53, and 54 must be read out at one-half the speed of the write function to compensate for the "dead" time required during the read cycle.

Matrix switch 47 controls the switching of the YC video data between the buffers, delay/memory units, and output DAC's in accordance with the basic method set forth in applicant's U.S. Pat. No. 5,264,924, and as further illustrated in the table of FIG. 9.

The table of FIG. 9 illustrates the sequence of illumination periods, readout periods, and delays of the YC data and video signal outputs at each of a sequence of field or illumination periods, T. In FIG. 9, "E" represents the even field and "O" the odd video field.

Images with depth perception can be produced by the system by switching a synchronized shutter from a left optical zone in the endoscope to a right optical zone in each complete sequence Y-Red-Y-Blue or RGB illumination sequence.

Thus, although there have been described particular embodiments of the present invention of a new and useful "Video Imaging System and Method Using a Single Full Frame Sensor and Sequential Color Object Illumination", it is not intended that such references be construed as limitations upon the scope of this invention except as set forth in the following claims.

What I claim is:

1. A sequential color video imaging system for viewing an object, said system comprising:
   a. a full frame video sensor having an image array of horizontal and vertical photosensitive elements and shift register means to move video data from said sensor for processing, said horizontal and vertical photosensitive elements responsive to levels of light reflected from the object;
   b. object illumination means to illuminate the object, said object illumination means including separately operable first, second, and third primary color light sources;
   c. timing and driver means operably connected to said object illumination means to activate said first, second, and third primary color light sources in a pre-determined repeating sequence of illumination periods and to de-activate said light sources during video data readout periods;
   d. sensor driver means operably connected to said sensor to shift from said sensor shift register means the video data responsive to the level of light reflected from the object during each of said illumination periods; and
   e. processor means operably connected to said sensor, to read and transform said video data shifted from said sensor into a corresponding sequence of video signals representing the object viewed by said imaging system.

2. The system of claim 1 further comprising video amplifier means to amplify the video data from said sensor before processing in said processor means.

3. The system of either of claims 1 or 2 further comprising means for wireless transmission of said video data to a remote location.

4. An improved method of processing video data in a sequential color video camera comprising the steps of:
   a. illuminating an object to be viewed with repeating sequences of red and green, red, red and green, and blue light during corresponding luminance signal, first chrominance signal, luminance signal, and second chrominance signal illumination periods;
   b. sensing and integrating in a sensor having a video data image array a level of light reflected by the object during each of said luminance signal and said first and second chrominance signal illumination periods, said sensor having full frame architecture;

c. shifting at the end of each of said luminance and first and second chrominance signal illumination periods, the video data from said video data image array into a video data storage array;

d. reading the video data stored in said video data storage array into a video amplifier;

e. processing the video data outputted from said video amplifier corresponding to said luminance signal illumination periods to produce a luminance video signal; and f. processing the video data outputted from said video amplifier corresponding to said first and second chrominance signal illumination periods to produce first and second chrominance video signals.

5. The method of claim 4 further comprising the step of switching in a predetermined sequential manner said video data among Y memory and first and second chrominance memory units.

* * * * *